UNITED STATES PATENT OFFICE.

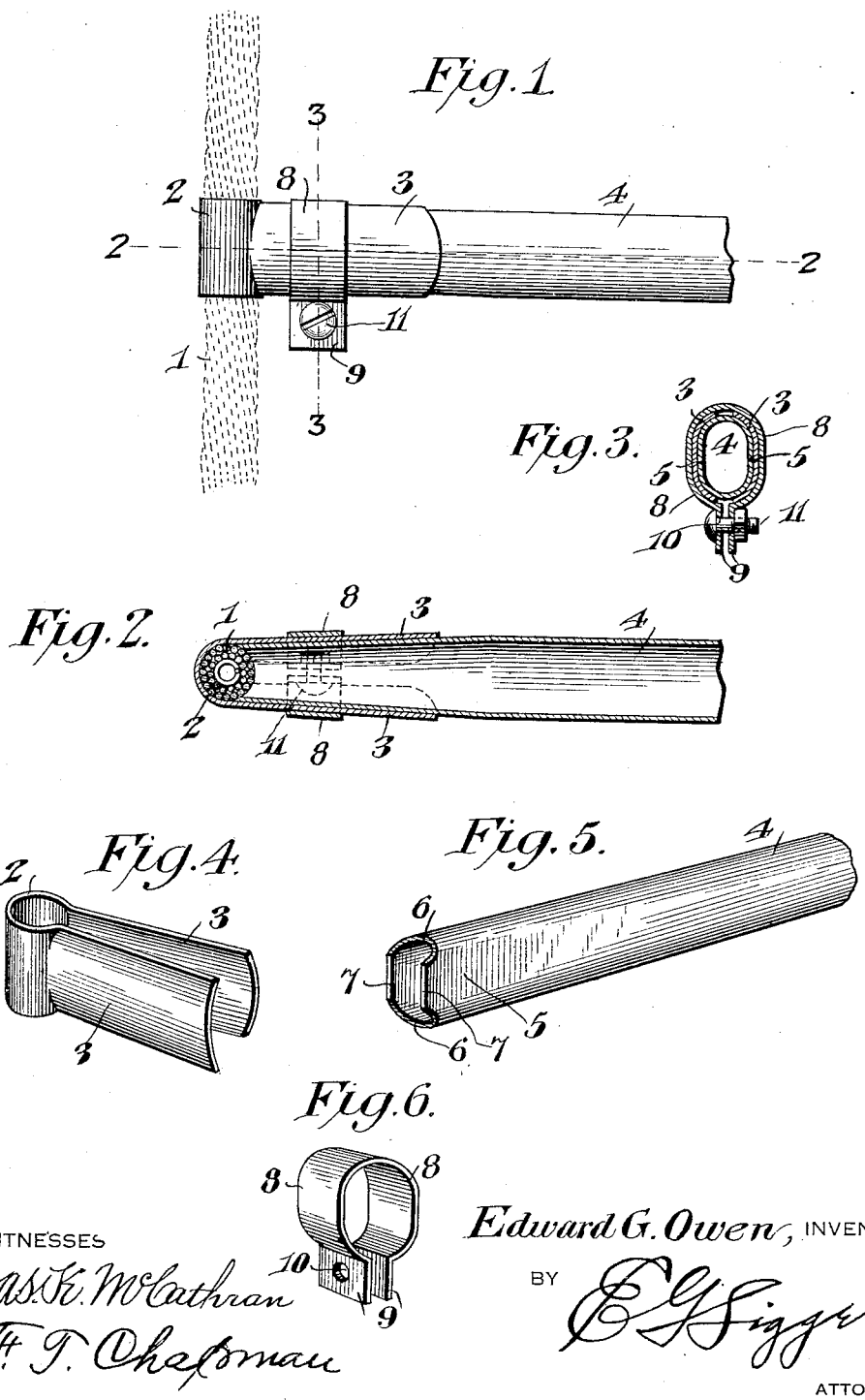

EDWARD GLEN OWEN, OF JANESVILLE, WISCONSIN.

LIGHTNING-ROD COUPLING.

1,133,176.   Specification of Letters Patent.   Patented Mar. 23, 1915.

Application filed April 19, 1913. Serial No. 762,373.

*To all whom it may concern:*

Be it known that I, EDWARD GLEN OWEN, a citizen of the United States, residing at Janesville, in the county of Rock and State of Wisconsin, have invented a new and useful Lightning-Rod Coupler, of which the following is a specification.

This invention has reference to improvements in couplers for lightning rods, and its object is to provide a coupler which may be readily applied to a lightning rod for holding points or branches of the lightning rod thereto in a particular manner and establishing particularly good electrical connection.

It has heretofore been proposed to produce a coupler in the form of a yoke embracing the lightning rod and having the legs of the yoke shaped to conform to the interior of a tubular extension, which extension is inserted over and therefore receives the legs of the yoke. Practice has demonstrated that such a coupler is unreliable and it sometimes transpires that the tubular member will work off the coupler, usually called a T-coupler, thus disconnecting the main circuit of the lightning rod from the tubular member, usually of copper, and the point carried by the tubular member, or in case of a branch of the lightning rod, from such branch.

In accordance with the present invention the so-called T-coupler or yoke is employed, but it is so constructed as to embrace the tubular extension instead of being received thereby, and this tubular extension is flattened and has the end embraced by the legs of the T coupler concaved or hollowed to partially encircle the lightning rod while the legs of the T coupler are firmly clamped to the tubular member by an exterior clip so that the several parts are almost as firmly joined as though made in one piece, and liability of accidental disconnection of the parts is practically eliminated.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention expressed in the claims.

In the drawings:—Figure 1 is an elevation of the coupler as it would appear when attached to an upright lightning rod and extending horizontally. Fig. 2 is a section on the line 2—2 of Fig. 1. Fig. 3 is a section on the line 3—3 of Fig. 1, with distant parts omitted. Fig. 4 is a perspective view of the yoke or T coupling member. Fig. 5 is a perspective view of the tubular member. Fig. 6 is a perspective view of the clip but omitting the clamp screw.

Referring to the drawings there is indicated a lightning rod 1, but as the present invention has nothing to do with the structure of the lightning rod a small portion of the latter has simply been indicated in Fig. 1, in dotted lines. The lightning rod employed is usually made of twisted copper wire of comparatively small gage built up to an appropriate diameter and carrying capacity. In Fig. 1 this lightning rod is shown as upright, but it may as well be considered as extending horizontally as though along the ridge of a roof. Surrounding the lightning rod is an approximately cylindrical member 2 from opposite sides of which extend legs 3, these legs being concaved on their inner surfaces, and in general tangential to the incomplete cylinder 2, so that the cylinder 2 and legs 3 form a yoke somewhat resembling a T except that the legs 3 are or may be as wide as the cylinder 2 is long. There is also provided a tube 4 which may be of any suitable length, and particularly is made of a length to readily receive a point such as is designed to take the lightning stroke and conduct it to the lightning rod 1, wherefore the tube 4 is of suitable size and gage to provide ample conducting surfaces. One end 5 of the tube 4 is flattened so that the tube at such end is in cross section an approximate ellipse, while the terminal portion of the flattened end of the tube is cut away or concaved at diametrically opposite points of the longer axis, as indicated at 6, the concavity 6 conforming to the peripheral portion of the lightning rod 1, while the flattened end 5 of the tube 4 and the interior cavities of the legs 3 agree, so that the flattened portion 5 of the tube 4 may be introduced between the legs 3 until the cut-away portions 6 closely embrace a corresponding portion of the lightning rod 1, the parts of the tube between the concave or cut away portions 6 forming tongues 7 which partially surround the lightning rod 1 where engaged by the tube 2 of the coupling.

Shaped to embrace the exterior of the legs 3 is a clip 8 having terminal ears 9 each provided with a perforation 10 matching that of the other, so that when the clip is placed about the legs 3 with the latter embracing the flattened portion 5 of the tube 4 a bolt 11 may be passed through the holes 10 and when tightened will draw the ears 9 one toward the other, thus contracting the clip 8 about the legs 3 and the latter are forced into close frictional engagement with the flattened end 5 of the tube 4, with the tube having the edges of the concavities 6 in engagement with the lightning rod 1 and the tongues 7 engaging the lightning rod on opposite sides thereof within that portion of the cylinder 2 adjacent the legs 3. Flattening the junction end of the tube 4 somewhat widens it in one direction and narrows it in the other, so that it has a greater extent of engagement with the lightning rod than would otherwise be the case, while the tongues 7 add to the extent of contact, thereby improving the electrical contact markedly. The legs 3 being exterior to the tube 4 are readily forced together by the clip 8, so that a proportionately large surface of the inner walls of the legs 3 is in engagement with a correspondingly large surface of the tube 4, thus also contributing to the electrical contact and, moreover, providing such extended frictional engagement that liability of disconnection of the parts is practically eliminated.

The device is very readily attached and disengaged and may be made entirely of copper and because of the tubular arrangement the coupling is particularly stiff and rigid, although made of a comparatively soft metal. Copper is to be preferred for lightning rods because of its very great conductivity to electric currents, but being a metal that is easily bent or forced out of shape is ill adapted for such couplings as have been heretofore in use where the coupling yoke enters the tubular member. However, the present invention avoids these difficulties by so arranging the parts that the coupling member is exterior to the tubular member and is forced into firm engagement therewith by the clip, the fact that the legs of the coupling member are separate and readily move one toward the other permitting a very firm grip being established between the legs of the coupling member and the tube, and a correspondingly firm grip upon the lightning rod, so that disconnecting or even displacement of the tubular member with respect to the lightning rod is to all intents and purposes avoided, except when purposely done.

What is claimed is:—

1. In a lightning rod structure, a coupling comprising a yoke member shaped intermediately to embrace a lightning rod and having opposed leg members extending from the intermediate portion, a tubular member having an end adapted to enter between the legs of the yoke and there adjacent to the lightning rod flattened on opposite sides into substantially elliptical cross-section with the longer axis of the ellipse of greater length and the shorter axis of less length than the diameter of the tubular member where entering between the legs of the yoke, and clamping means exterior to the legs of the yoke member in embracing relation thereto adjacent to the outer ends of the legs of the yoke member, whereby the tubular member is prevented from movement away from the lightning rod lengthwise of the yoke because of the greater diameter of the flattened end of the tubular member in the line of the longer axis of the ellipse than that portion of the tubular member where surrounded by the clamping means.

2. A lightning rod structure comprising a lightning rod, a yoke member bent intermediately upon itself and there embracing the lightning rod and having leg portions extending from the intermediate portion in opposed relation, a tubular member having one end flattened or compressed into substantially elliptical form in cross-section and there entering between the legs of the yoke and at the extremity hollowed out at the ends of the longer diameter of the ellipse to engage the lightning rod in partially embracing relation thereto with the longer axis of the ellipse of greater length than the normal diameter of the tubular member where entering between the legs of the yoke, and a clip member surrounding the legs of the yoke adjacent to their outer ends and where the tubular member is of normal diameter, whereby because of the greater length of the longer axis of the flattened end of the tubular member over the normal diameter of said tubular member the latter remains firmly anchored to the lightning rod.

In testimony, that I claim the foregoing as my own, I have hereto affixed my signature in the presence of two witnesses.

EDWARD GLEN OWEN.

Witnesses:
Wm. Schutz,
Jesse D. Owen.